(12) United States Patent
Mishan

(10) Patent No.: US 11,473,760 B1
(45) Date of Patent: Oct. 18, 2022

(54) SOLAR GARDEN LIGHT STICK

(71) Applicant: E. MISHAN & SONS, INC., New York, NY (US)

(72) Inventor: Edward I. Mishan, New York, NY (US)

(73) Assignee: E. MISHAN & SONS, INC., New York, NY (US)

( * ) Notice: Subject to any disclaimer, the term of this patent is extended or adjusted under 35 U.S.C. 154(b) by 0 days.

(21) Appl. No.: 17/580,485

(22) Filed: Jan. 20, 2022

(51) Int. Cl.
| | |
|---|---|
| *F21V 21/08* | (2006.01) |
| *F21S 10/02* | (2006.01) |
| *F21V 23/04* | (2006.01) |
| *F21V 7/00* | (2006.01) |
| *F21S 9/03* | (2006.01) |
| *F21Y 115/10* | (2016.01) |
| *F21W 131/109* | (2006.01) |

(52) U.S. Cl.
CPC .......... *F21V 21/0824* (2013.01); *F21S 9/035* (2013.01); *F21S 10/023* (2013.01); *F21V 7/0025* (2013.01); *F21V 23/0464* (2013.01); *F21W 2131/109* (2013.01); *F21Y 2115/10* (2016.08)

(58) Field of Classification Search
CPC ............ F21S 9/03; F21S 9/035; F21S 10/023; F21W 2131/109; F21Y 2115/10; F21V 21/0824; F21V 7/0025; F21V 23/0464; F21V 33/006
See application file for complete search history.

(56) References Cited

U.S. PATENT DOCUMENTS

| | | | |
|---|---|---|---|
| 4,195,907 A | 4/1980 | Zamja | |
| 4,422,719 A | 12/1983 | Orcutt | |
| 4,466,697 A | 8/1984 | Daniel | |
| 4,903,179 A | 2/1990 | Lin | |
| 5,003,439 A | 3/1991 | Yang | |
| 5,092,807 A * | 3/1992 | Lew .......................... | F21L 4/00 446/219 |
| D370,290 S | 5/1996 | Papillon | |
| D403,266 S | 12/1998 | Burnett | |
| D410,560 S | 6/1999 | Bezborodko | |
| D421,237 S | 2/2000 | Sands | |
| D458,175 S | 6/2002 | Wang | |
| 6,474,858 B1 | 11/2002 | Liao | |
| D485,388 S | 1/2004 | Weiser | |
| D513,332 S | 12/2005 | Ip | |
| 6,974,228 B2 | 12/2005 | Weiser | |
| 7,059,740 B2 | 6/2006 | Opolka | |
| 7,204,608 B2 | 4/2007 | Beeman | |
| 7,429,827 B2 | 9/2008 | Richmond | |
| 7,461,943 B1 | 12/2008 | Ip | |

(Continued)

*Primary Examiner* — Peggy A Neils
(74) *Attorney, Agent, or Firm* — Notaro, Michalos & Zaccaria P.C.

(57) ABSTRACT

A solar light stick for use in illuminating and decorating a lawn, garden or pathway. The solar light stick includes a supporting stake, a solar panel, a rechargeable battery, at least one LED, and a tube body. The tube body contains a light transmissive material that may be transparent or translucent. The solar panel charges the rechargeable battery which, in turn, provides power to the LEDs. The LEDs are positioned to provide light to the interior of the tube body. As such, the LEDs may be located within a recess in the tube body. Reflective flakes dispersed within the tube body reflect and disperse light from the LEDs in a decorative manner.

10 Claims, 14 Drawing Sheets

(56) References Cited

U.S. PATENT DOCUMENTS

| | | |
|---|---|---|
| 7,661,838 B2 | 2/2010 | Chen |
| 7,740,177 B2 | 6/2010 | Weiser |
| D622,438 S | 8/2010 | Sasada |
| 8,035,119 B2 | 10/2011 | Ng |
| 8,362,700 B2 | 1/2013 | Richmond |
| 8,684,553 B2 * | 4/2014 | Chen ................ F21S 9/035 362/159 |
| D807,540 S | 1/2018 | Soofer |
| D807,541 S | 1/2018 | Soofer |
| 9,970,612 B2 | 5/2018 | Soofer |
| 10,433,397 B2 | 10/2019 | Richmond |
| D884,260 S | 5/2020 | Soofer |
| 10,683,975 B2 | 6/2020 | Zinsky |
| 10,779,377 B2 | 9/2020 | Richmond |
| 2005/0005288 A1 | 3/2005 | Wu |
| 2005/0017475 A1 | 8/2005 | Liao |
| 2006/0001297 A1 | 1/2006 | Allsop |
| 2006/0004478 A1 | 3/2006 | Lee |
| 2006/0018765 A1 | 8/2006 | Kuelbs |
| 2007/0003068 A1 | 2/2007 | Wang |
| 2007/0026338 A1 | 2/2007 | Kaiho et al. |
| 2007/0005318 A1 | 3/2007 | Lai |
| 2007/0012131 A1 | 5/2007 | Huang |
| 2007/0024784 A1 | 10/2007 | Schrimmer |
| 2008/0247155 A1 * | 10/2008 | Allsop ................ F21S 8/081 362/183 |

* cited by examiner

SOLAR GARDEN LIGHT STICK

FIELD AND BACKGROUND OF THE INVENTION

The subject technology relates to solar powered lights for lawns and gardens.

SUMMARY OF THE INVENTION

The present invention is directed to a solar light stick for use on lawns and gardens. The solar light stick has a supporting stake, a solar panel, a rechargeable battery, at least one LED, and a tube body. The tube body may be made of a light transmissive material that may be transparent or translucent. The solar panel charges the rechargeable battery which, in turn, provides power to the LEDs.

The LEDs are positioned to provide light to the interior of the tube body. Suspended objects, such as reflective flakes help to disperse light from the LEDs away from the tube body.

According to an aspect of the subject technology, an outdoor light stick includes a supporting stake, the supporting stake having an upper end and a lower end. There is also provided a double-barreled rod receiver having a thumb support, an upper receiving cylinder, the upper receiving cylinder, and a lower receiving cylinder. In preferred embodiments, there is a housing hingedly connected to the double-barreled rod receiver. The housing includes a top housing cover and a bottom housing cover. There is also provided a solar panel located on the housing such that the solar panel may be exposed to ambient light. The invention also includes a rechargeable battery within the housing and in communication with the solar panel.

There is, as well, in preferred embodiments, a printed circuit board ("PCB") located within the housing and in communication with the rechargeable battery, a user-operable switch, and the LEDs.

A user-operable switch is provided in communication with the PCB. In preferred embodiments, the switch is exposed on the exterior of the housing for easy access.

Thus, the rechargeable battery is provided in the housing to power the LEDs and associated circuitry. The rechargeable battery is charged by a solar cell or cells of the solar panel, preferably positioned on the top of the housing. The solar panel is also used as a light detector, so that the light stick will illuminate only in low-light conditions. This feature enables unattended operation, which is desirable in a landscape light.

In preferred embodiments, the invention also includes tube body, the tube body having a proximal end and a distal end, the tube body comprising a rigid, clear plastic and having a smooth, cylindrical surface, the tube body containing interior reflective flakes to disperse the light from the LEDs.

The various features of novelty which characterize the subject technology are pointed out with particularity in the claims annexed to and forming a part of this disclosure. For a better understanding of the subject technology, its operating advantages and specific objects attained by its uses, reference is made to the accompanying drawings and descriptive matter in which preferred embodiments of the subject technology are illustrated.

DETAILED DESCRIPTION OF THE INVENTION

Figure 1:
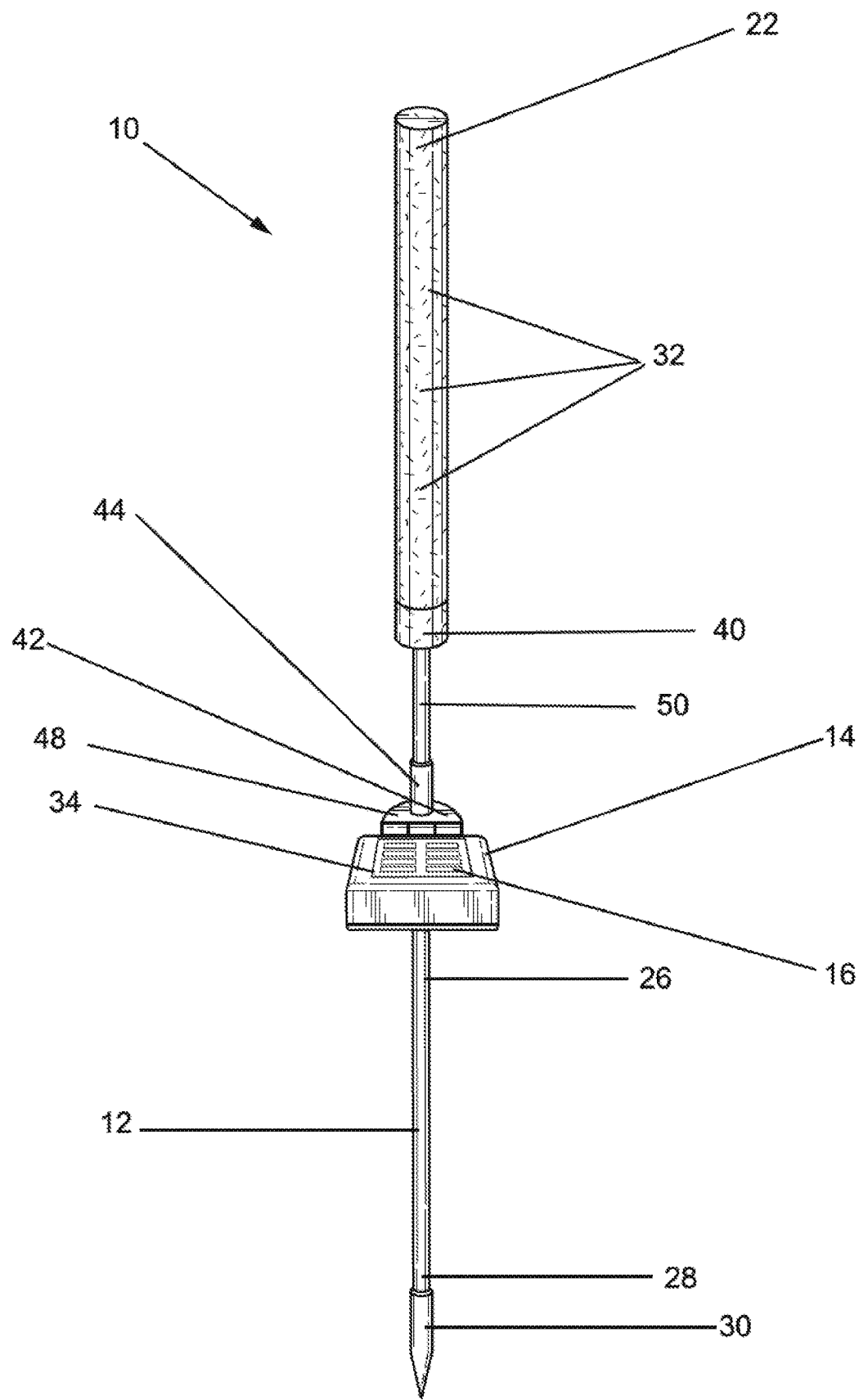
FIG. 1 is a top, front perspective view of an embodiment of a solar light stick.
Figure 2:
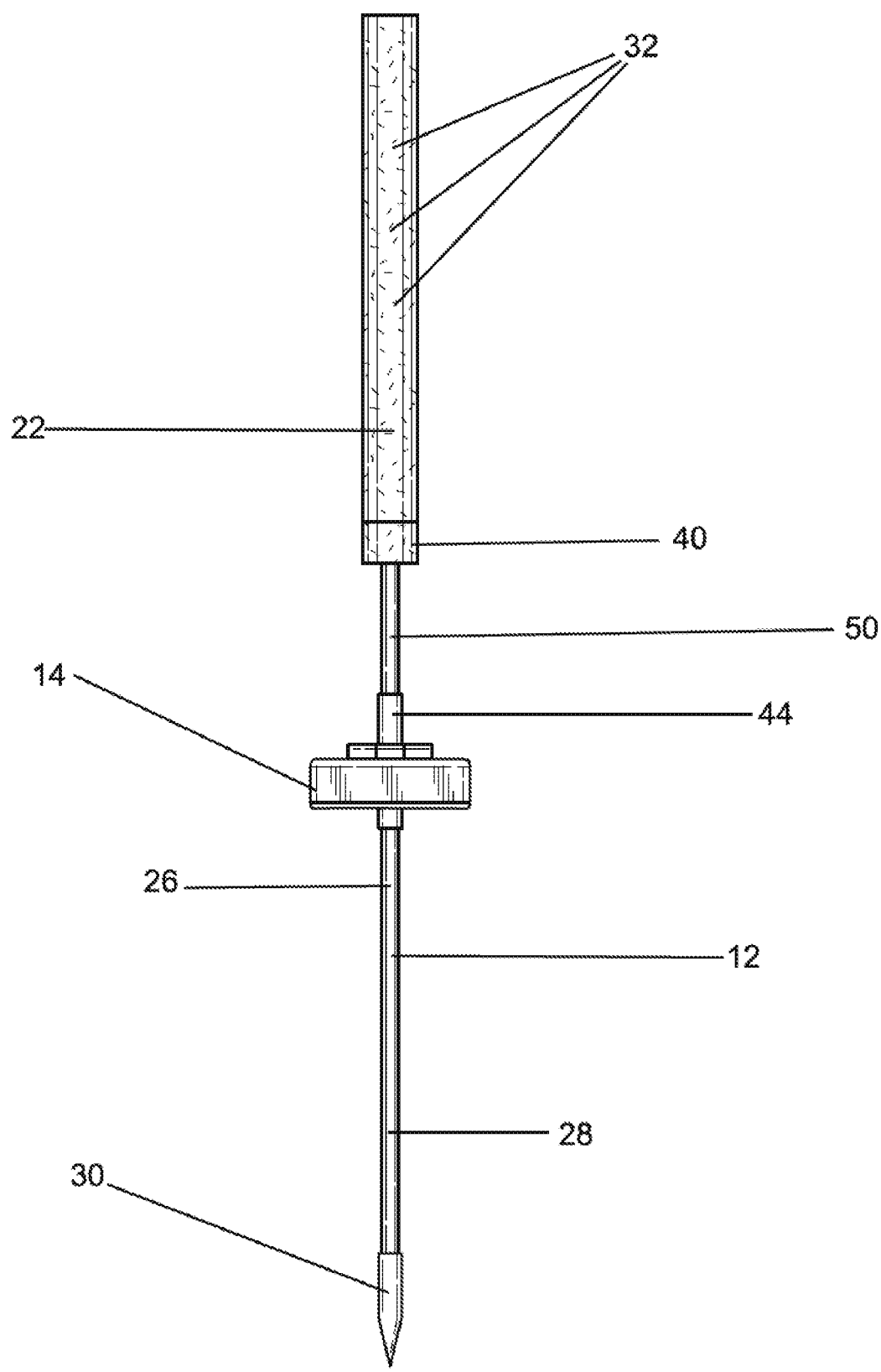
FIG. 2 is a front view thereof.
Figure 3:
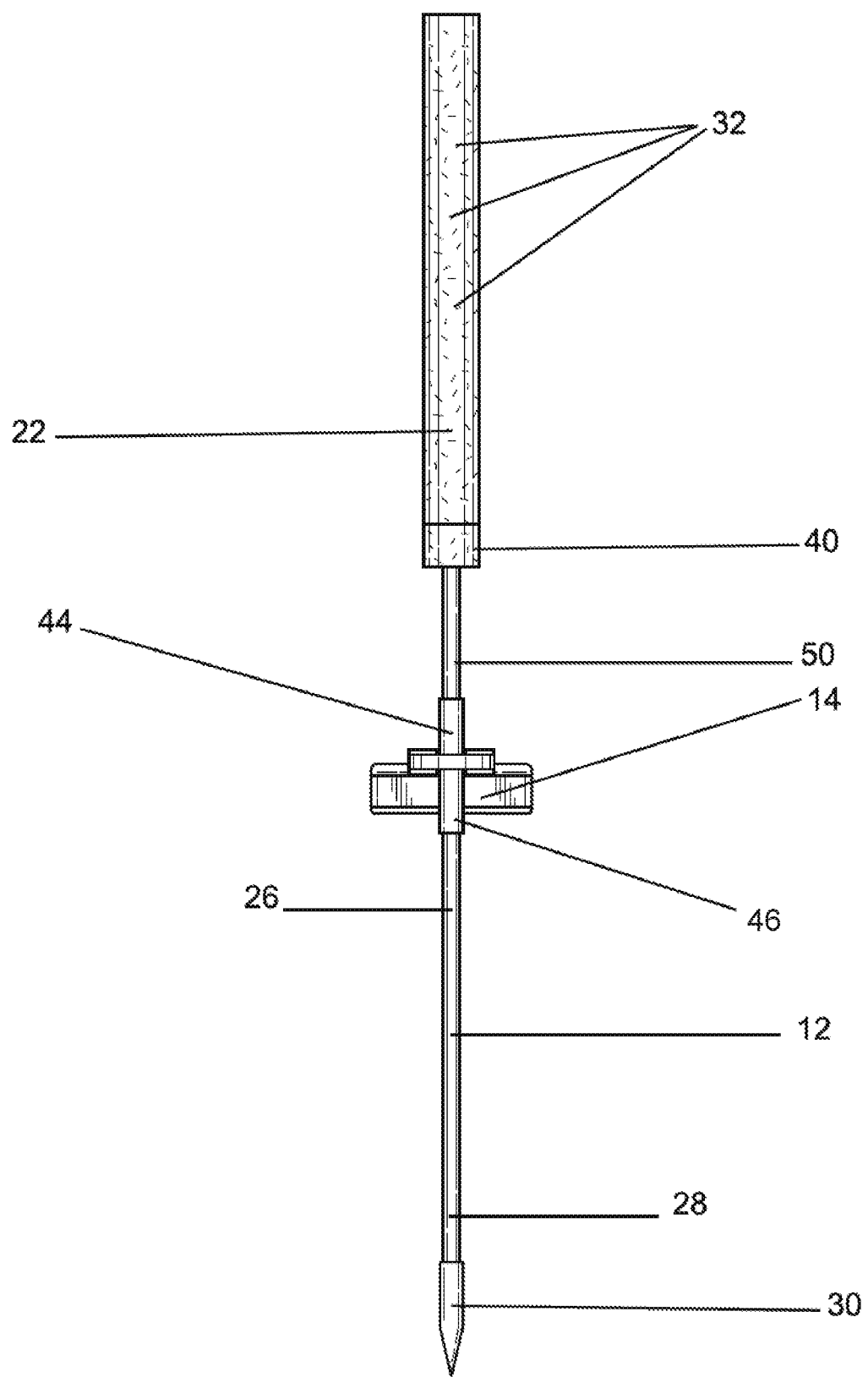
FIG. 3 is a rear view thereof.
Figure 4:
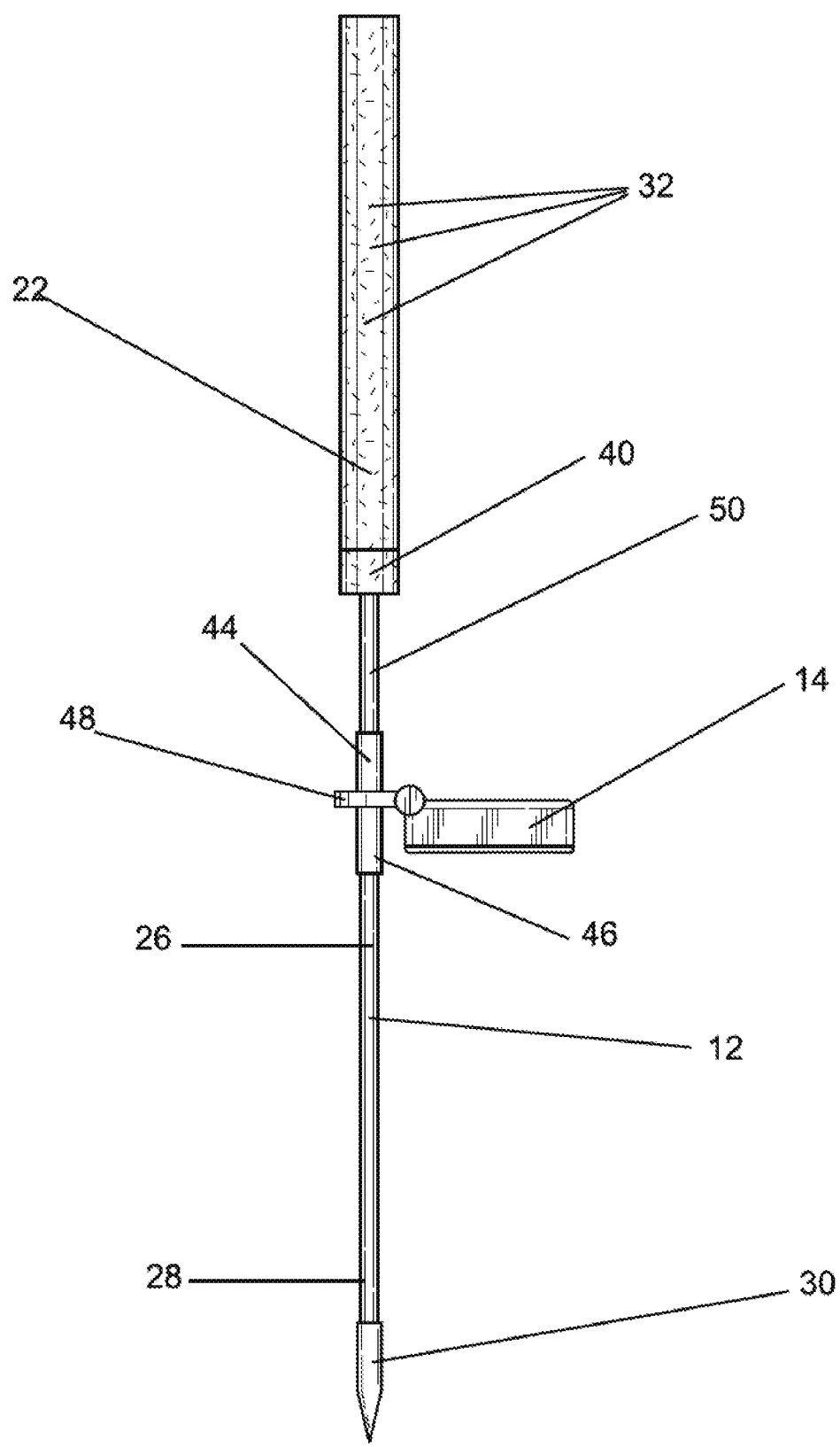
FIG. 4 is a right side view thereof.
Figure 5:
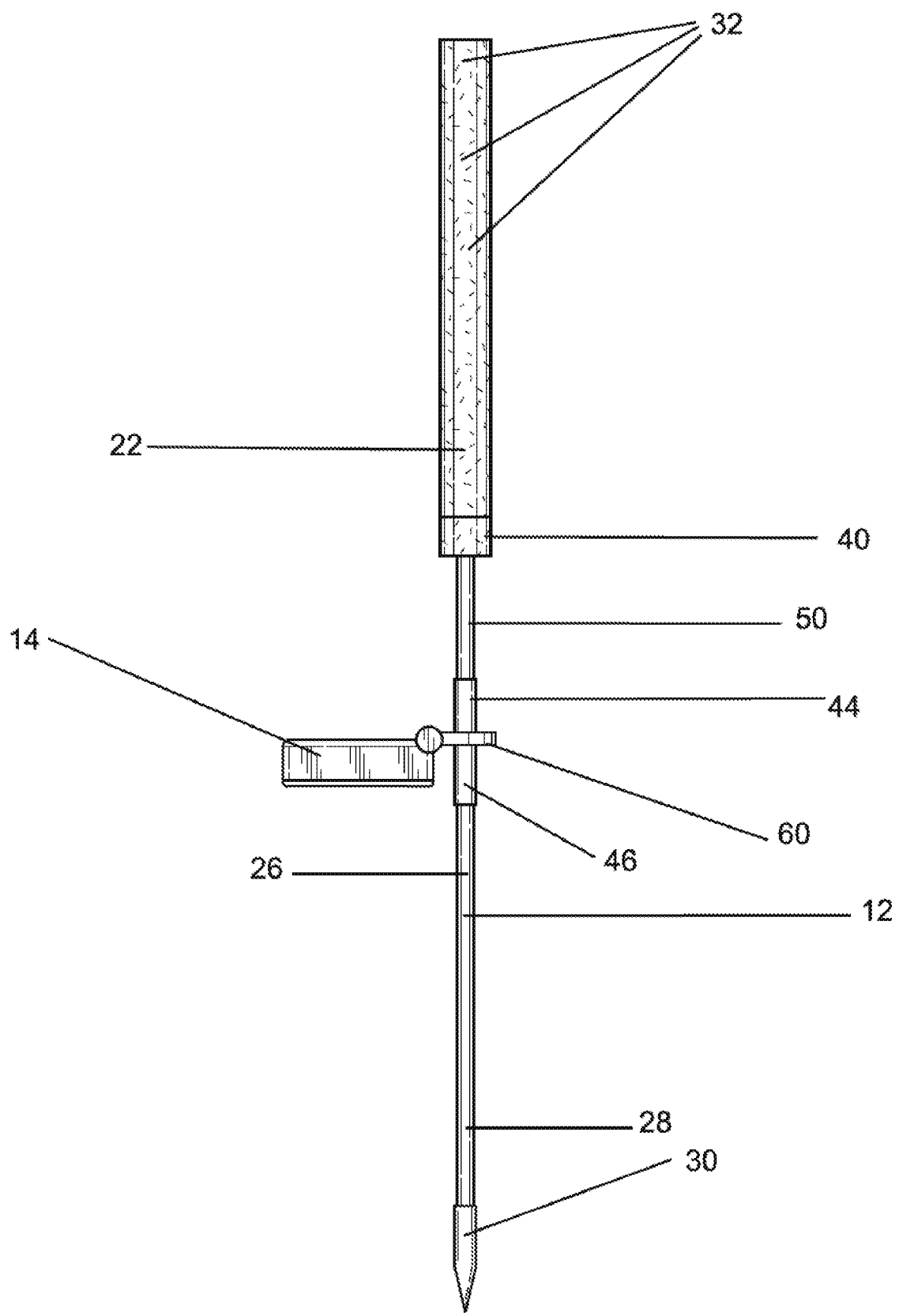
FIG. 5 is a left side view thereof.
Figure 6:
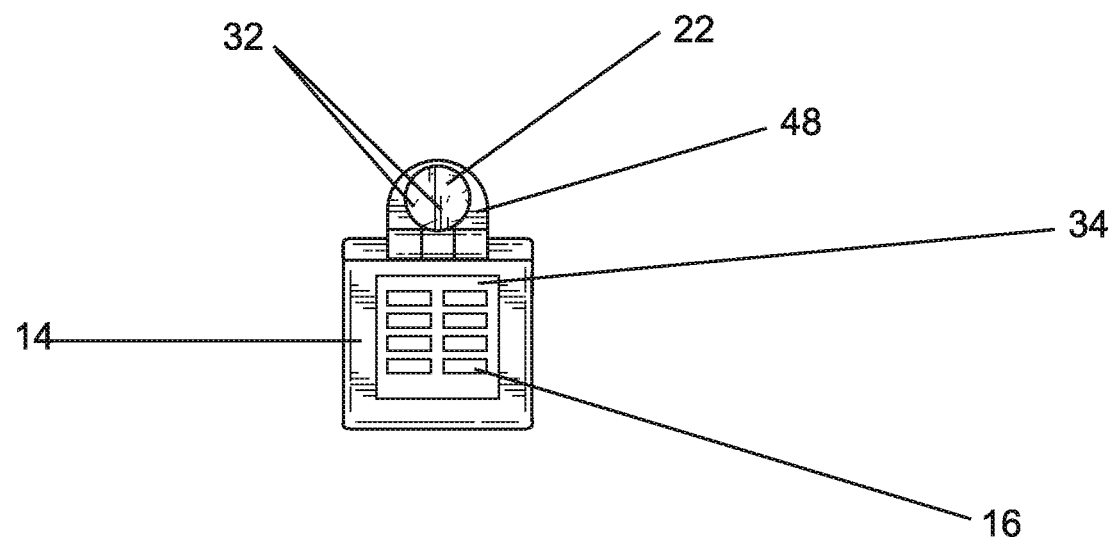
FIG. 6 is a top plan view thereof.
Figure 7:
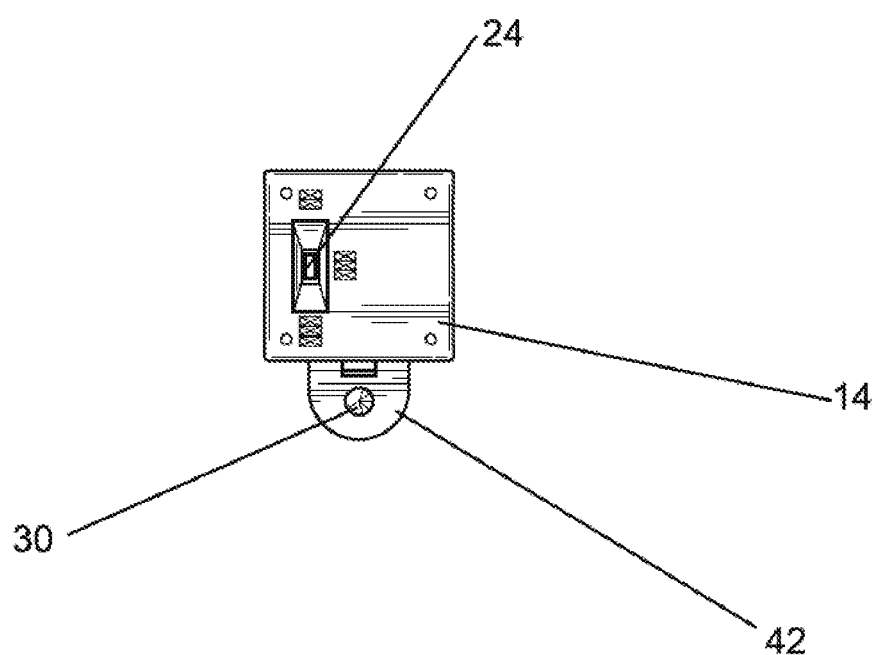
FIG. 7 is a bottom plan view thereof.
Figure 8:
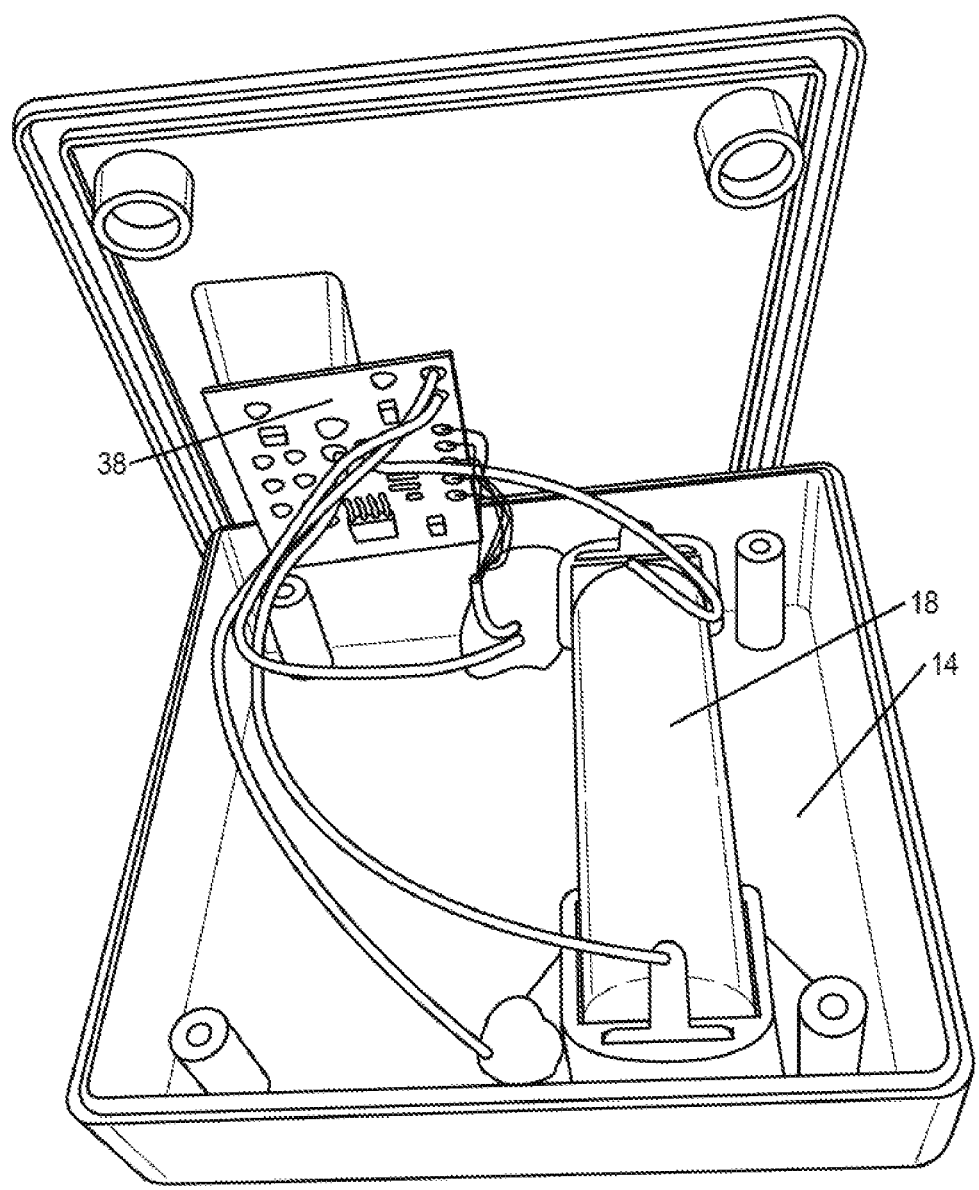
FIG. 8 is a view of the internal parts and wiring of the housing, including the printed circuit board ("PCB"), according to an embodiment of the invention.
Figure 9:
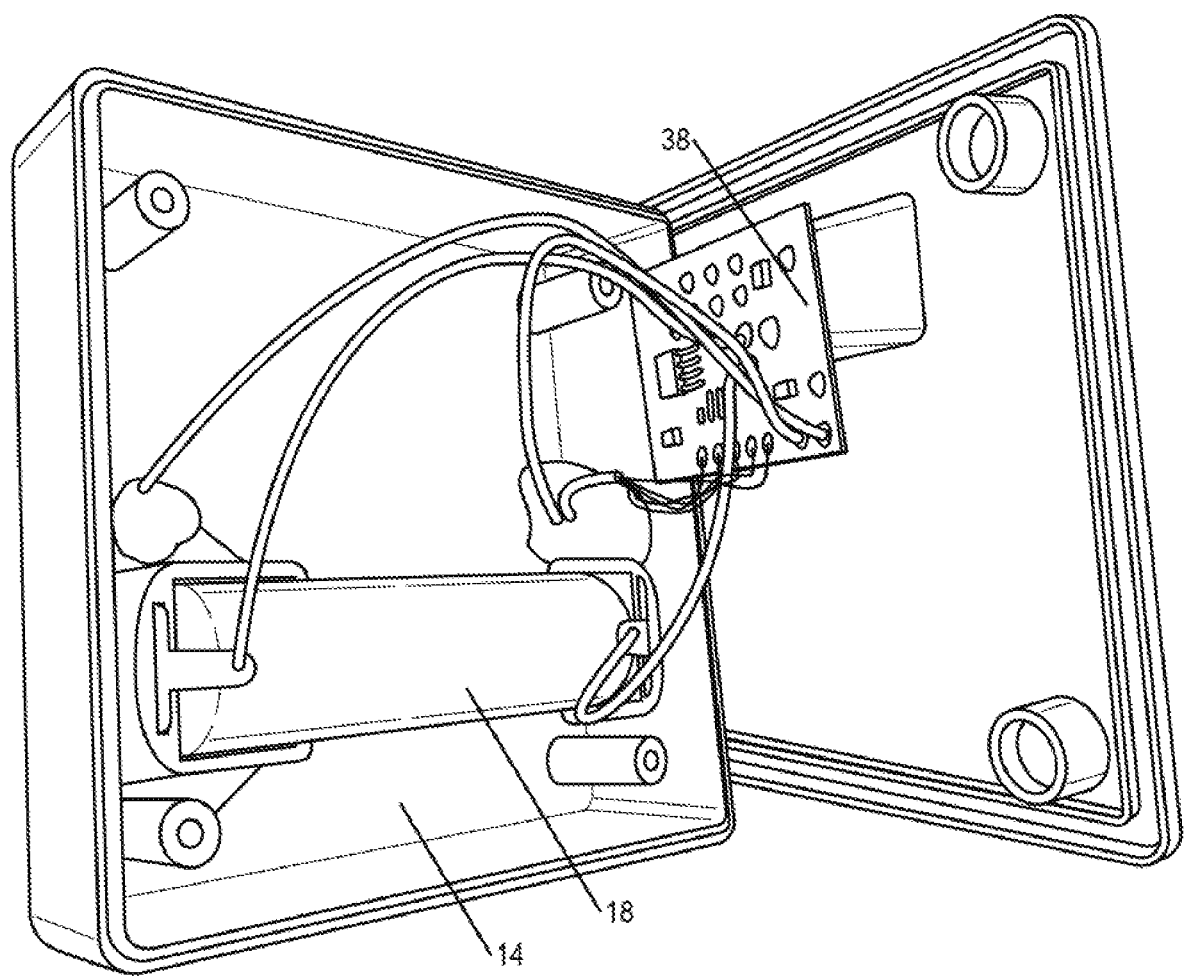
FIG. 9 is another view of the internal parts and wiring of the housing.
Figure 10:
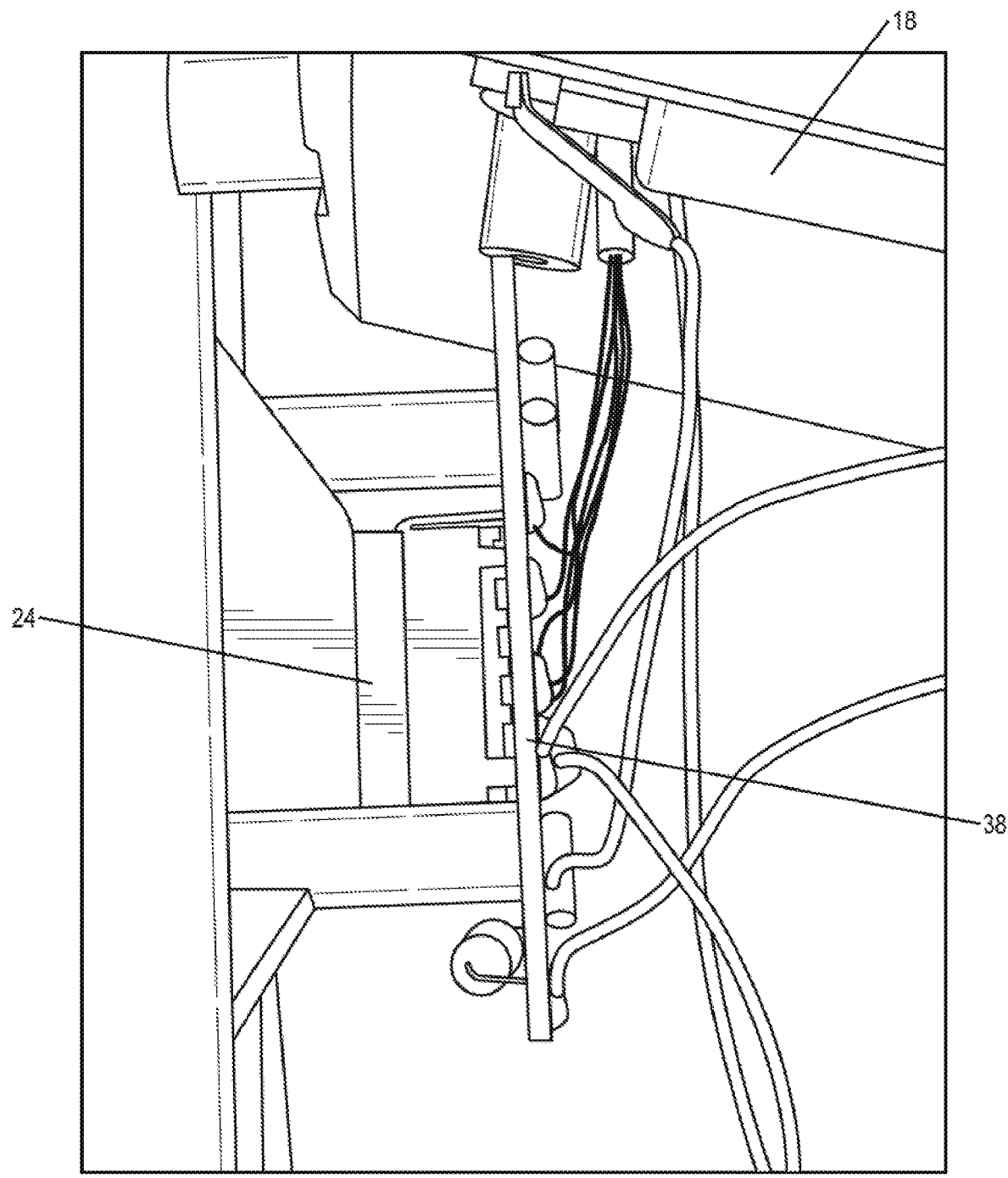
FIG. 10 is further view of the internal parts and wiring of the housing.
Figure 11:
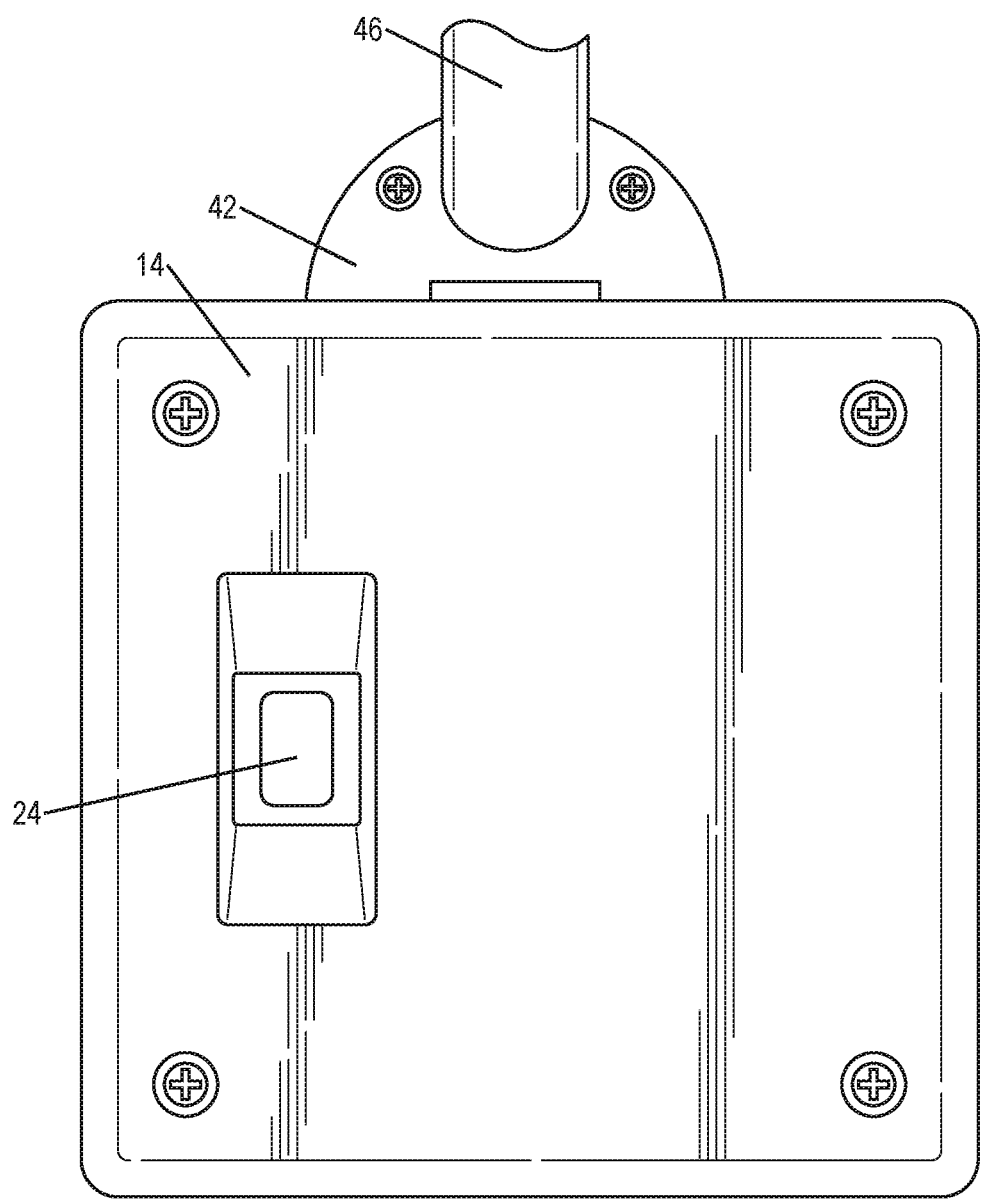
FIG. 11 is a close-up view of the bottom of the housing showing the user-activated switch.
Figure 12:
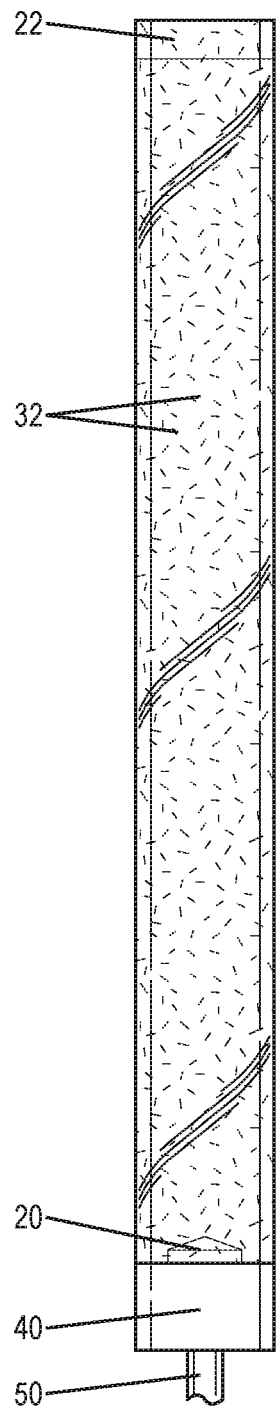
FIG. 12 is a close-up view of the tube body with reflective flakes and the tube body support cup.
Figure 13:
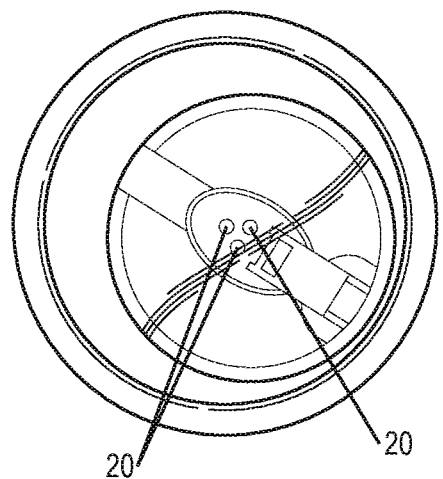
FIG. 13 is a close-up view of the showing the LEDs.
Figure 14:
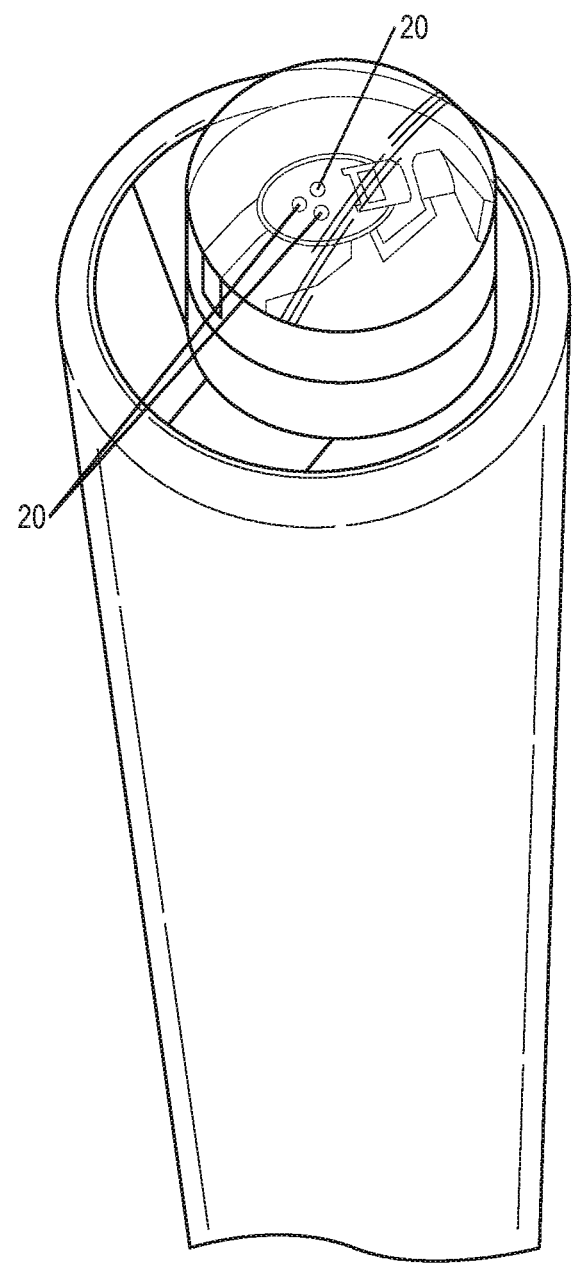
FIG. 14 is a further close-up view of the showing the LEDs.

According to an aspect of the subject technology, as shown in Figures, the present invention is directed to a solar light stick 10 having multiple uses including, but not limited to illuminating a lawn, garden or pathway. The solar light stick 10 has a supporting stake 12, a housing 14, a solar panel 34 comprising solar cell or cells 16, a rechargeable battery 18, LEDs 20, and a tube body 22. A switch 24 is provided at the bottom of the housing. In preferred embodiments, the switch 24 is exposed on the exterior of the housing 14 for easy access.

The supporting stake 12 has an upper end 26 and a lower end 28. The lower end 28 may be inserted into the ground to install the solar light stick 10 in a lawn or garden. In certain embodiments, the lower end 28 is provided with, or is formed in the shape of, a spike or point 30. The spike 30 is advantageously made of rubber, but it is also within the scope of the invention for the spike to be made of metal or plastic. In one embodiment, the supporting stake 12 may be an elongated member, such as a metal rod or tube, such as an aluminum rod. The supporting stake 12 may also be made from other materials such as plastic, composites, and other metals such as stainless steel.

The invention also includes double-barreled rod receiver 42 having an upper receiving cylinder 44, and a lower receiving cylinder 46. The upper end 26 of the support stake 12 is adapted to fit within the lower receiving cylinder 46. The double-barreled rod receiver is also provided with a thumb support 48. The thumb support 48 is advantageously designed and positioned to facilitate the easy and effective driving of the support stake 12 into the ground. The thumb support 48 is also advantageously designed and positioned to facilitate the easy and effective removal of the support stake 12 from the ground. It is within the scope of the invention for the housing 14 to be hingedly connected to the double-barreled rod receiver 42.

The supporting stake 12 and the tube body 22 define a vertical axis. The thumb support 48 extends orthogonally from the vertical axis. The upper receiving cylinder 44 and the lower receiving cylinder lie along the vertical axis 46.

The tube body 22 may be made of plastic, such as acrylic or other plastic, glass, or any another light transmissive material that may be transparent or translucent. The tube body 22 may be rigid or flexible. In an embodiment of the invention, the tube body 22 may have a smooth, cylindrical surface. However, it is equally contemplated that the tube body 22 may have a polygonal cross-section. Non-elongated shapes are also contemplated for the tube body 22. The tube body 22 may contain suspended objects, such as reflective flakes 32, to disperse light from the LEDs 20. In some embodiments, the tube body 22 may have shaped objects suspended within it to disperse the light from the LEDs 20. Such shapes might be, for example, triangles, pyramids, spheres, cubes, squares, tubes, stars, hearts, ribbons, strips, and other geometric forms, either in their usual profiles or altered, such as by twisting, to improve light dispersal. It is also contemplated that the tube body 22 may have surface depressions or irregularities such that the non-smooth surface may disperse light from the LEDs 20. It is within the scope of the invention for one or multiple LEDs 20 to be provided in the tube body 22.

The tube body 22 is affixed to a tube body support cup 40, the tube body support cup 40 being connected to a tube body support cup pillar 50, the tube body support cup pillar 50 adapted to fit securely within the upper receiving cylinder 44 of the double-barreled rod receiver 42.

The tube body 22 may be oriented in an upright fashion, as is depicted in the figures. It is also contemplated that the tube body 22 may be oriented in other directions, such as horizontally or obliquely.

Thus, in typical embodiments, the supporting stake 12 is a cylindrical rod and the supporting stake 12 extends into the lower receiving cylinder 46. Also, in typical embodiments, the tube body support cup pillar 50 is a cylindrical rod, and the tube body support cup pillar 50 extends into the upper receiving cylinder 44.

The LEDs 20 are positioned to provide light to the interior of the tube body 22. For example, the LEDs 20 may be located within the recess 36. In this way, the light from the LEDs 20 may be directed, at least in part, along the length of the tube body 22. Suspended objects, such as reflective flakes 32 reflect and disperse light from the LEDs 20 and help to disperse light from the LEDs 20 in a direction other than along the length of the tube body 22, and especially in a direction external to the tube body. Thus, the light from the LEDs 20 may be more visible to an observer of the solar light stick 10.

The housing 14 may contain a solar panel 34 comprising a solar cell or cells 16 and the rechargeable battery 18. The solar panel 34 is positioned such that, when the solar light stick 10 is installed in the ground, the solar cell or cells 16 receive ambient light from the sun or another light source. In turn, the solar cell or cells 16 charge the rechargeable battery 18. In an advantageous aspect of the invention, the housing 14 is hingedly connected to the double-barreled rod receiver 42, so that the housing 14 may be positioned such that the solar panel 34 is, in turn, positioned to receive an optimal amount of ambient light. The hinged connection also provides the advantage of quick, easy and convenient storage of one or more solar light sticks 10 together.

The solar panel 34 functions to permit activation of the LEDs 20 during periods of low ambient light (e.g., nighttime) and may prevent activation of the LEDs 20 during periods of high ambient light (e.g., daytime). The relatively low and high levels of ambient light may be set by a predetermined ambient light threshold.

As noted, rechargeable battery 18 is provided in the housing 14 to power the LEDs 20 and associated circuitry. The rechargeable battery 18 is preferably charged by the solar panel 34, the solar panel 34 preferably positioned on the top of the housing 14 when installed. The solar panel 34 also has light sensing capabilities, so that the light stick 10 will illuminate only in low-light conditions. In that aspect of the subject technology, if the light stick 10 detects sufficient ambient light in the area of the light stick 10, enough to indicate that the conditions are not dark, the control circuitry will suppress the operation of the LEDs 20. Otherwise, the LEDs 20 will be illuminated (or not, under the control of the user-activated switch 24). This feature enables unattended operation, which is desirable in a landscape light.

A PCB 38 may be disposed and mounted in the housing 14. In embodiments of the invention, the PCB 38 is wired to the user-operable switch 24, the rechargeable battery 18, and the LEDs 20.

The user-operable switch 24 is provided and configured to enable the user to select between a variety of operating modes. In an embodiment, the switch 24 is a three-position switch, and enables user choice of three modes: 1. Off, 2. On, and 3. RGB.

To use the solar light stick 10, the supporting stake 12 is inserted into the ground on a user's lawn or garden or adjacent to the person's driveway or walkway. More than one solar light stick 10 may be placed in various locations in a user's lawn or garden to create various ornamental designs and lighting effects. The solar light stick 10 is positioned such that the solar cell or cells 16 may receive ambient light from the sun or another light source. The switch 24 may be pushed to the "On" or "RGB" position. The solar cell or cells 16 convert the energy absorbed from the ambient light into electrical potential in the rechargeable battery 18 through methods known in the art. Once the rechargeable battery 18 has sufficient electrical potential and when the ambient light is below a preset amount (such as after sunset), the rechargeable battery 18 provides power to the LEDs 20, and the LEDs 20 illuminate. If the "On" setting has been activated, then the light stick 10 provides white light. In preferred embodiments, if the "On" setting has been activated, then the light stick 10 provides continuous white light. If the "RGB" setting has been activated, then the light stick 10 provides light in a series of successive colors. In preferred embodiments, the colored lights are provided in a random sequence of colors. When the ambient light is above a preset amount (such as after sunrise), the light stick 10 is extinguished.

It should be understood that the ornamental appearance of the light and components thereof as shown in the Figures are within the scope of the subject technology.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. An outdoor light stick, comprising:
   a supporting stake, the supporting stake having an upper end and a lower end;
   a double-barreled rod receiver further comprising a thumb support, an upper receiving cylinder, and a lower receiving cylinder;
   a housing hingedly connected to the double-barreled rod receiver;
   a solar panel located on the housing such that the solar panel may be exposed to ambient light;

a rechargeable battery within the housing and in communication with the solar panel;
a PCB located within the housing and in communication with the rechargeable battery;
a switch, the switch being in communication with the PCB, wherein the switch is exposed on the exterior of the housing;
at least one LED in communication with the PCB;
a tube body, the tube body having a proximal end and a distal end, the tube body being cylindrical, the tube body containing interior reflective flakes to disperse light from the at least one LED;
a tube body support cup;
a tube body support cup pillar; and
a spike provided at the lower end of the supporting stake,
wherein the supporting stake and the tube body define a vertical axis, wherein the thumb support extends orthogonally from the vertical axis, wherein upper receiving cylinder and the lower receiving cylinder lie along the vertical axis,
wherein the tube body support cup pillar is a cylindrical rod, wherein the tube body support cup pillar extends into the upper receiving cylinder.

2. The outdoor light stick according to claim 1, wherein the housing comprises a top housing cover and a bottom housing cover.

3. The outdoor light stick according to claim 1, wherein the supporting stake is a cylindrical rod, wherein the supporting stake extends into the lower receiving cylinder.

4. The outdoor light stick according to claim 1, wherein the tube body is affixed to the tube body support cup.

5. An outdoor light stick, comprising:
a supporting stake, the supporting stake having an upper end and a lower end;
a double-barreled rod receiver further comprising a thumb support, an upper receiving cylinder, and a lower receiving cylinder;
a housing hingedly connected to the double-barreled rod receiver;
a solar panel located on the housing such that the solar panel may be exposed to ambient light;
a rechargeable battery within the housing and in communication with the solar panel;
a PCB located within the housing and in communication with the rechargeable battery;
a switch, the switch being in communication with the PCB, wherein the switch is exposed on the exterior of the housing;
at least one LED in communication with the PCB;
a tube body, the tube body having a proximal end and a distal end, the tube body being cylindrical, the tube body containing interior reflective flakes to disperse light from the at least one LED;
a tube body support cup;
a tube body support cup pillar; and
a spike provided at the lower end of the supporting stake,
wherein the supporting stake and the tube body define a vertical axis, wherein the thumb support extends orthogonally from the vertical axis, wherein upper receiving cylinder and the lower receiving cylinder lie along the vertical axis,
wherein the housing comprises a top housing cover and a bottom housing cover,
wherein the supporting stake is a cylindrical rod, wherein the supporting stake extends into the lower receiving cylinder,
wherein the tube body support cup pillar is a cylindrical rod, wherein the tube body support cup pillar extends into the upper receiving cylinder,
wherein the tube body is affixed to the tube body support cup,
wherein the tube body is provided with a recess at the proximal end to accommodate the at least one LED.

6. The outdoor light stick according to claim 5, wherein when the switch activates an "On" setting, the light stick provides continuous white light.

7. The outdoor light stick according to claim 5, wherein when the switch activates an "RGB" setting, the light stick provides light in a series of successive colors.

8. The outdoor light stick according to claim 5, wherein the series of successive colors is a random sequence of colors.

9. The outdoor light stick according to claim 5, wherein when ambient light is above a preset level, the light stick is extinguished.

10. An outdoor light stick, comprising:
a supporting stake, the supporting stake having an upper end and a lower end;
a double-barreled rod receiver further comprising a thumb support, an upper receiving cylinder, and a lower receiving cylinder;
a housing hingedly connected to the double-barreled rod receiver;
a solar panel located on the housing such that the solar panel may be exposed to ambient light;
a rechargeable battery within the housing and in communication with the solar panel;
a PCB located within the housing and in communication with the rechargeable battery;
a switch, the switch being in communication with the PCB, wherein the switch is exposed on the exterior of the housing;
at least one LED in communication with the PCB;
a tube body, the tube body having a proximal end and a distal end, the tube body being cylindrical, the tube body containing interior reflective flakes to disperse light from the at least one LED;
a tube body support cup;
a tube body support cup pillar; and
a spike provided at the lower end of the supporting stake,
wherein the supporting stake and the tube body define a vertical axis, wherein the thumb support extends orthogonally from the vertical axis, wherein upper receiving cylinder and the lower receiving cylinder lie along the vertical axis,
wherein the housing comprises a top housing cover and a bottom housing cover,
wherein the supporting stake is a cylindrical rod, wherein the supporting stake extends into the lower receiving cylinder,
wherein the tube body support cup pillar is a cylindrical rod, wherein the tube body support cup pillar extends into the upper receiving cylinder,
wherein the tube body is affixed to the tube body support cup,
wherein the tube body is provided with a recess at the proximal end to accommodate the at least one LED,
wherein when the switch activates an "On" setting, the light stick provides continuous white light, wherein when the switch activates an "RGB" setting, the light stick provides light in a series of successive colors, wherein the series of successive colors is a random sequence of colors, and wherein when ambient light is above a preset level, the light stick is extinguished.

* * * * *